Nov. 4, 1930.  G. A. PROCTOR  1,780,363
SUN BATH APPARATUS
Filed Dec. 27, 1928   3 Sheets-Sheet 1
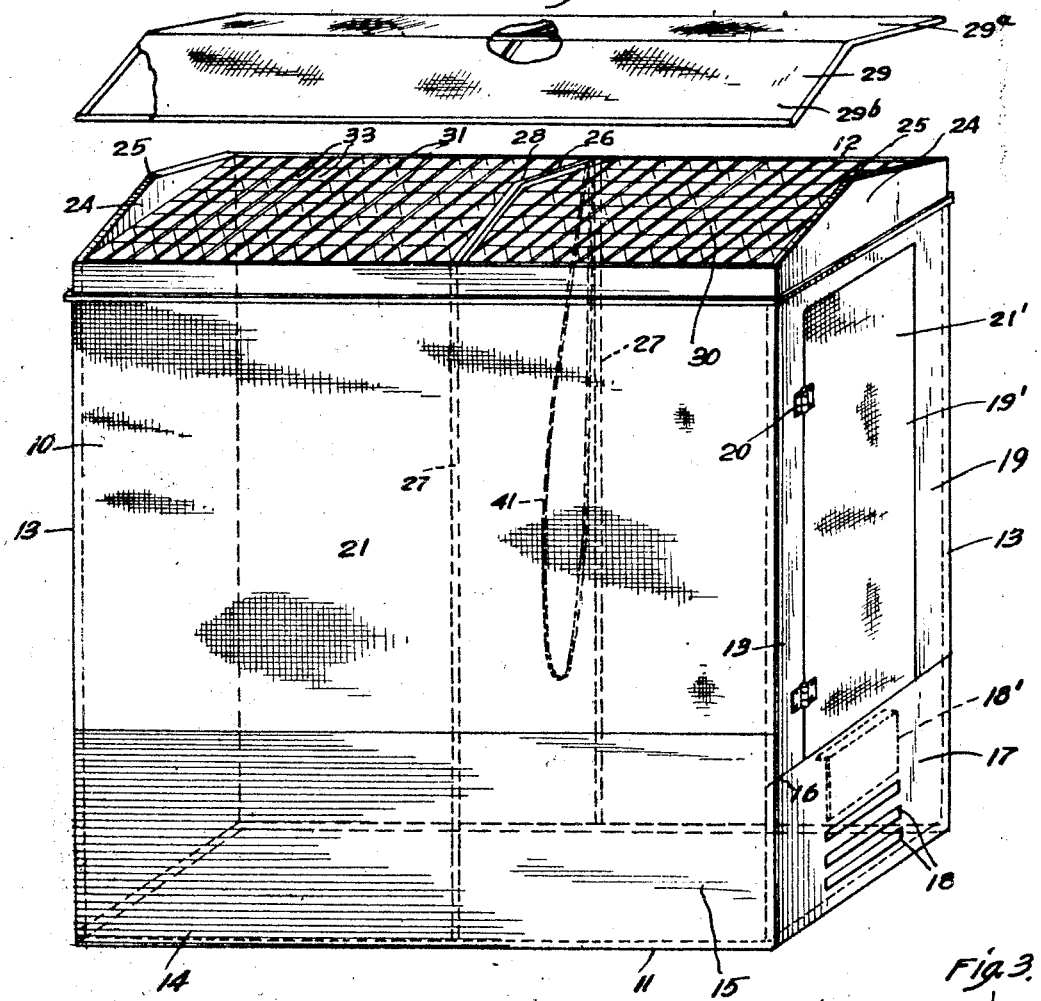
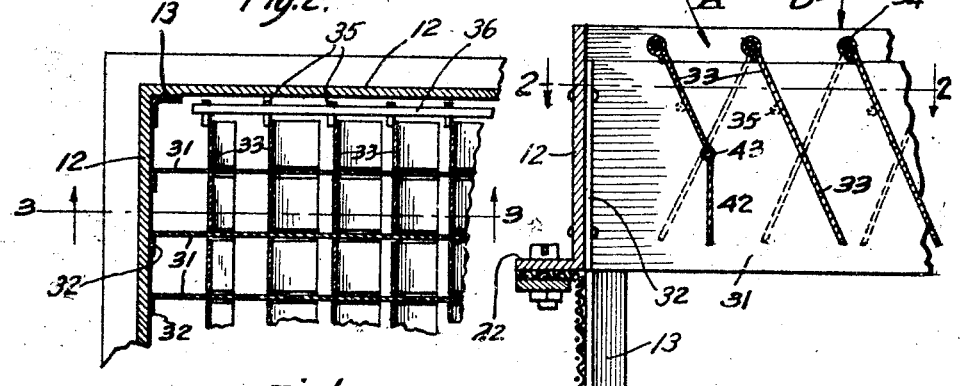
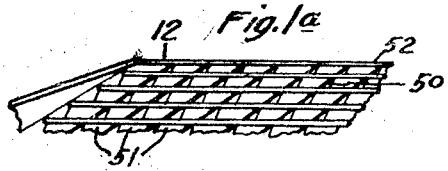
INVENTOR.
George A. Proctor
BY Arthur P. Knight and
Alfred W. Knight
ATTORNEYS Nov. 4, 1930.  G. A. PROCTOR  1,780,363
SUN BATH APPARATUS
Filed Dec. 27, 1928  3 Sheets-Sheet 2
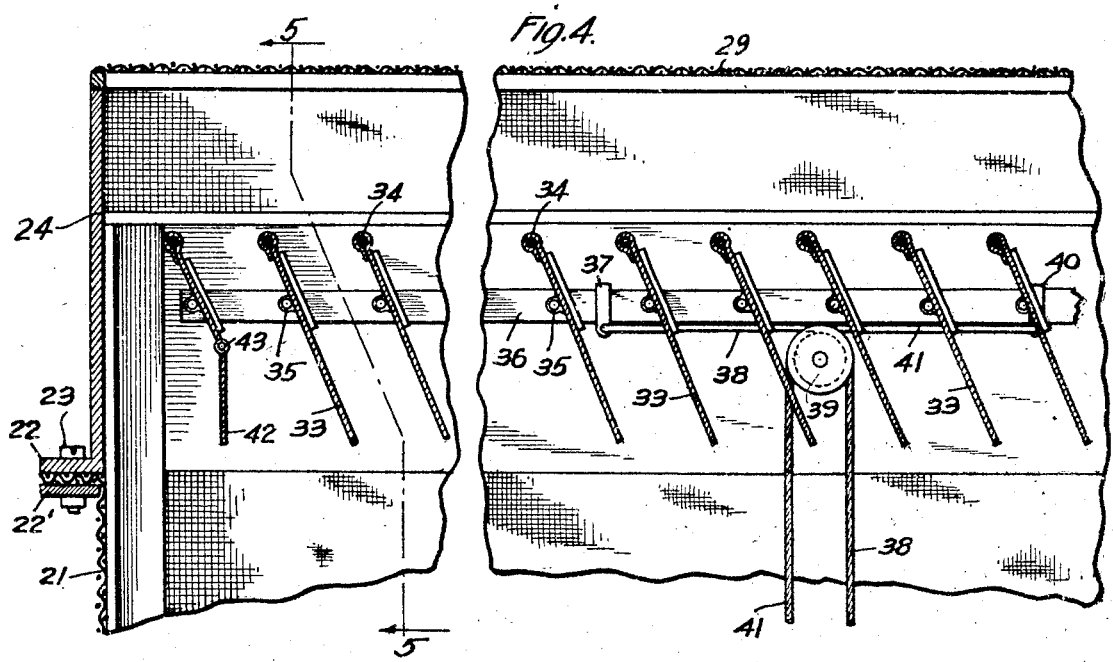
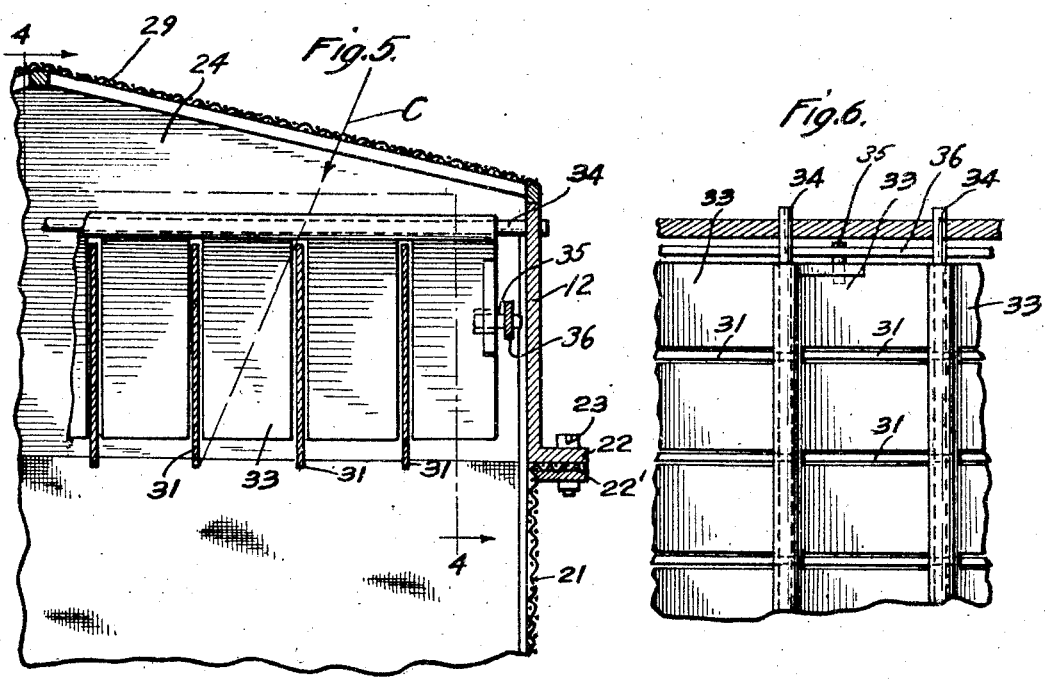
INVENTOR.
George A. Proctor
BY Arthur P. Knight and
Alfred W. Knight
ATTORNEYS Nov. 4, 1930.  G. A. PROCTOR  1,780,363
SUN BATH APPARATUS
Filed Dec. 27, 1928  3 Sheets-Sheet 3
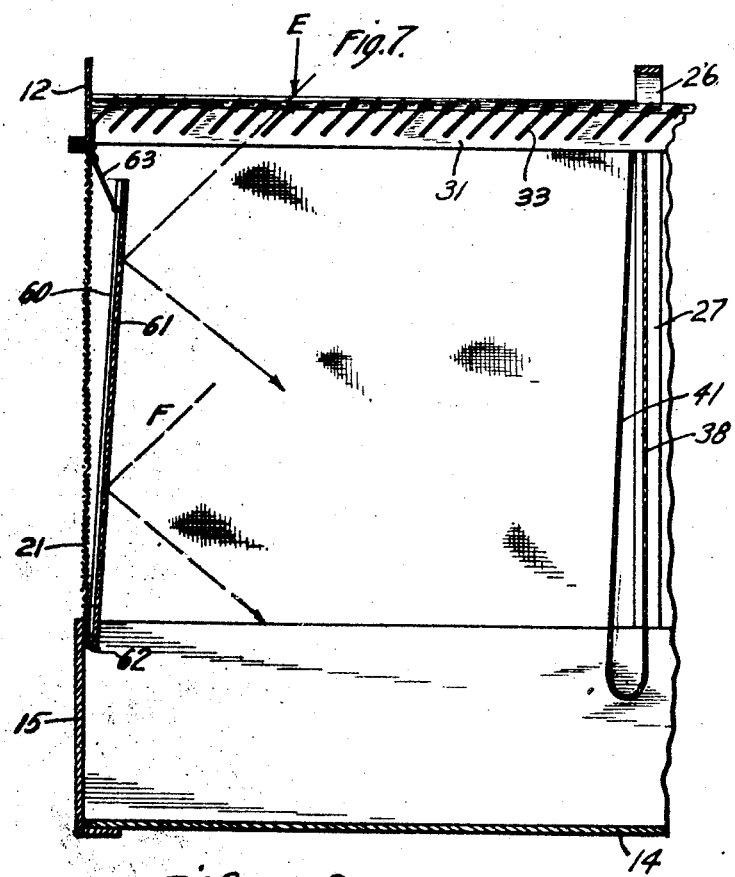
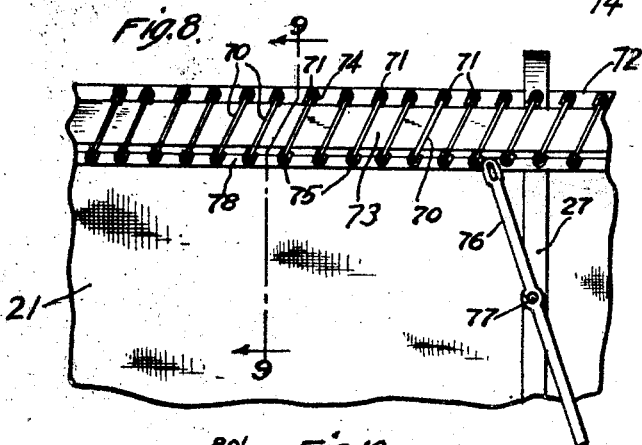
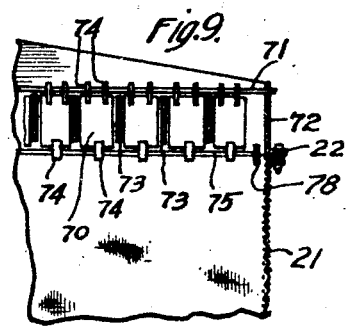
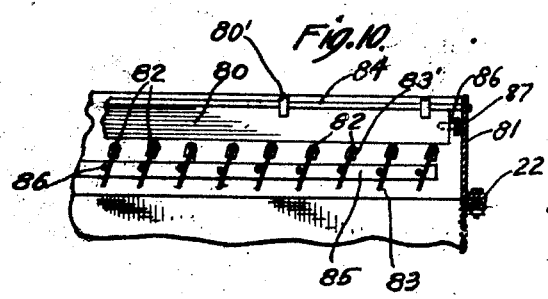
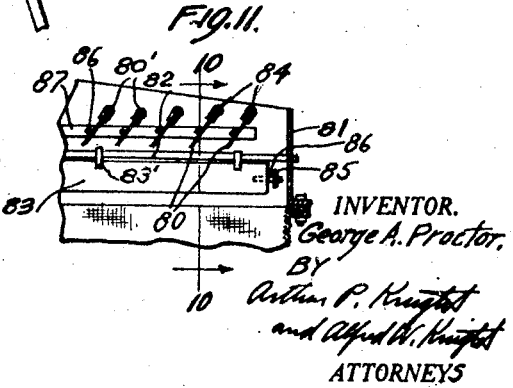
INVENTOR.
George A. Proctor,
BY
Arthur P. Knight
and Alfred W. Knight
ATTORNEYS Patented Nov. 4, 1930

1,780,363

UNITED STATES PATENT OFFICE

GEORGE A. PROCTOR, OF LOS ANGELES, CALIFORNIA

SUN-BATH APPARATUS

Application filed December 27, 1928. Serial No. 328,681.

This invention relates to an apparatus for sun baths and more particularly to the construction of a housing comprising a compartment for helio-therapeutic treatments.

Broadly, my invention includes the provision of a helio-therapeutic compartment in which the occupant is exposed to the sun's rays without being viewed from the outside.

The principal objects and advantages which characterize the present invention reside in the provision of an improved sun bath apparatus having means for admitting helio rays while excluding view of the interior thereof from outside; the provision of a novel grid having pivoted closely spaced strips shiftable to be in alignment with the sun's rays for admission thereof within the compartment; the provision of a helio-therapeutic housing compartment with sides, ends and a top, in which is secured novel screens permitting passage of light but shielding the occupant from view.

A further object of the invention is to provide an apparatus for helio-therapeutic treatments which can be easily manufactured, being simple and inexpensive in structure, and which is efficient and reliable in operation.

The invention is broadly new, basic and pioneer in that I provide a novel light transmitting top grid for shielding from view the occupant within the treatment compartment, together with translucent screens for the side and end walls.

While I shall describe my invention as being particularly useful as an apparatus for helio-therapy treatments, it will be understood that the invention is capable of embodiment in whole or in part in similar and non-analogous arts, and therefore finds a wide field of utility for use of the apparatus other than described here.

Other objects, advantages and features of my invention and discovery appear from the accompanying drawings, the subjoined detailed description and appended claims.

Referring to the drawings:—

Fig. 1 is a perspective elevational view of one form of the apparatus with a translucent cover detached therefrom; the cover being partly broken away.

Fig. 1ª is a fragmentary view in perspective of a modification of the grid.

Fig. 2 is a horizontal sectional view taken on the line 2—2 of Fig. 3 in the direction of the arrows, with the translucent cover removed.

Fig. 3 is a view taken on line 3—3 of Fig. 2 in the direction of the arrows.

Fig. 4 is a sectional view taken on the line 4—4 of Fig. 5 in the direction of the arrows, with the translucent cover in place.

Fig. 5 is a sectional view taken on the line 5—5 of Fig. 4 in the direction of the arrows.

Fig. 6 is a fragmentary plan view of the top grid.

Fig. 7 is a transverse sectional view of one end of the embodiment illustrated in Fig. 1 showing a mirror attached to the screen supporting means.

Fig. 8 is a fragmentary longitudinal view showing a modification of the grid and actuating means therefor.

Fig. 9 is a transverse view of Fig. 8 taken on the line 9—9 in the direction of the arrows.

Fig. 10 is a fragmentary longitudinal view showing another modification of the grid, taken on the line 10—10 of Fig. 11 in the direction of the arrows.

Fig. 11 is a fragmentary transverse view partly in section of the modification illustrated in Fig. 10.

In the drawings 10 designates the apparatus housing consisting of frame work embodying the lower frame 11, top frame 12, and upright frame members 13. The framework comprises a skeleton frame with an open bottom, top, front, rear, and side faces. Preferably, the skeleton frame is made from angle irons suitably secured together in any well known manner. Arranged and secured on the lower frame is the flooring 14 which may be of wood or any other suitable material.

A peripheral rim or wall 15 is preferably secured to the lower portion of the front, rear, and side faces of the framework, providing an absolute opaque shield to preclude view of the occupant during the course of treatment when in stretched or reclined position on or near the floor. The rim extends a considerable distance above the lower frame, but at the front face it is of somewhat less height, as at 16, thereby providing a lower step-over 17 comprising one face of the rim which is attached to the entrance side or front of the skeleton frame. The step-over 17 is preferably provided with a plurality of independent slots or louvers 18 to facilitate the ventilation of the interior of the housing compartment 10, while substantially precluding view therethrough. A door or closure member 18' may be slidably mounted on the inside of the step-over 17, so as to be movable to close or open said slots.

Secured to the front end 19 forming the entrance to the compartment is the door 19' hinged at 20 to the frame uprights. The two side faces of the frame, and the end opposite the door, are covered by a novel light transmitting translucent screen 21. The screens are held between the flanges 22 of the upper frame 12 and flat strips 22' respectively by a suitable bolt and nut clamping means 23 (see Figs. 4 and 5). In like manner the screens 21 may be preferably secured to flanges of the lower frame and side members, although, if desired, the screens may be secured to the rim 15, as well as to the various frame members, by any well known means. To obtain more light rays within the compartment, the door 19 is also preferably covered with a screen 21'. The ends 24 of the upper frame 12 are provided with sloping upper faces forming an apex 25.

For forming a rigid frame construction there is disposed between the sides 13 the brace 26 having leg members 27 secured to the upper and lower frames and embodying a sloping top comprising the apex 28. Associated with the top frame is the bent light transmitting translucent cover screen 29 comprising the sloping sides 29ª and 29ᵇ adapted to rest on and conform to the contour of the sloping faces of the ends of the top frame and of the brace 26.

Disposed within the upper top frame is the grid 30 which, as shown in Fig. 1, may comprise a plurality of longitudinally disposed fixed spaced strips 31 suitably secured to the upper frame by flanges 32, or in any well known manner. Cooperating with the spaced fixed strips, and extending perpendicular thereto, are the pivoted strips 33 carried by pivot rods 34 suitably journalled in the upper frame. The transverse pivoted strips 33 are adapted to form a grid effect with the fixed strips, and are angularly adjustable longitudinally of said upper frame by reason of their connection to pins 35 carried by the rack bar 36 having secured thereto the clevis 37 holding cable 38 which is trained over pulley 39 suitably journalled within the top frame. The rack bar 36 is also provided with a clevis 40 holding cable 41 which is also trained over pulley 39 independently of the cable 38. Thus, it is apparent that the pivoted strips actuated by the cable constitute an adjustable light admitting grid. The pivoted strip 33 adjacent each end of the frame (see Figs. 3 and 4) is reduced in size and provided with the freely swinging lower portion 42 pivoted at 43, to permit full adjustment, but in a shorter space.

In Fig. 1ª, the coacting strips of the grid are arranged so that the closely spaced transverse strips 50 are fixed within the upper frame 12 and the closely spaced longitudinally disposed movable strips 51 are pivotally carried by the pivot rods 52 and extend between the fixed strips 50. The pivoted strips 51 may be adjusted by means similar to those described above for adjusting the transverse pivoted strips 33 of Fig. 1. In this case, control of the amount of light permeating through the grid is governed by means of the longitudinal strips 51 moving relatively in a transverse zone in their angular travel between the transverse fixed strips 50. On the other hand, the grid of the embodiment disclosed in Fig. 1 comprises essentially longitudinally disposed fixed strips 31 between which are arranged tranverse pivoted spaced strips 33 adjusted to move relatively in a longitudinal zone in their angular adjustment between the fixed transverse strips 31.

The translucent screens 21 carried between the upper and lower frames and on the door 19, together with the bent cover screen 31, consist of a metallic screen meshing, such as ordinary window screen, which is coated with a translucent but non-transparent film of material over the meshes, such as a thin layer of clear or colored lacquer, to permit passage of the sun's rays, but preventing view of the occupant within the compartment from the outside.

Provision has been made for reflecting the sun's rays which ordinarily would not reach the occupant within the treatment compartment, by reason of the angular position of the sun beyond the limits for proper adjustment of the movable strips. To this end, a mirror 60 (see Fig. 7) having the reflecting surface 61 disposed inwardly, rests at its lower end against rim 15, and the upper portion of the mirror is held by a link or wire 63 suitably supported by the upper frame. In this way, sun rays such as E, and F, which ordinarily reach the interior of the compartment at such position as to be of no benefit, are reflected by the mirror to the position of the occupant so as to be utilized during the course of the treatment. Of course, it is within the scope of my invention to provide mirrors inside of the treatment compartment at each of the side and end walls thereof. Likewise, the mirrors may be supported in any suitable way to the frame members supporting the screens and, additionally, the inclination of the mirror may be varied by changing or adjusting the length of link or wire 63.

In operation of the apparatus above described the occupant may sit, stand or lie fully stretched or reclined upon the floor or upon a bed or the like, and adjust the movable pivoted strips 33 (or 51) to be substantially in alignment with the sun's rays by manipulating either of the control cables such as 38 or 41. The direction of the sun's rays is indicated by the inclined arrow at A in Fig. 3, after having passed the top bent screen 29 if the latter is employed during the course of the treatment. These rays, as shown, pass through the adjusted meshes of the grid between the pivoted strips 33. In this way the occupant may feel freely at ease during the course of the treatment in being shielded from view from the outside. View from any direction materially different from that of the sun's rays, such as indicated by the arrow at B in Fig. 3, is prevented by the angularly adjusted strips 33, while view from an appreciable angle to either side of the vertical plane of the sun's rays, for example from a direction such as indicated by the arrow at C in Fig. 5, is prevented by the closely spaced fixed strips 31. Of course, the housing compartment may be made of any desired size and the bent cover screen may be dispensed with if desired. Such cover is intended mainly for use in cold or windy weather, or for covering the apparatus in case of rains.

In the embodiment disclosed in Figs. 8 and 9, each of the closely spaced adjustable transverse strips comprises a plurality of segments 70 secured, as by a pair of inverted U-shaped spaced clips 74, to an upper pivot rod 71 extending transversely of the grid frame 72, said segments extending between the closely spaced longitudinally disposed fixed strips 73. The lower portions of the movable segments 70 are secured as by a single U-shaped clip 74, to a lower shifting rod 75. Of course, for each row of movable segments there is provided an upper and lower rod, such as the transverse spaced rods 71 and 75 respectively. The lever 76 fulcrumed at 77, to a post or standard such as 27, within the housing, operates a bar 78 connected to the lower rods 75 for changing the angular position of the movable segments 70, and any suitable means may be provided for holding and locking actuator lever 76 in properly adjusted position. An advantage of this construction is that the lower edges of the individual segments 70 are moved positively by rods 75, so that said segments may be made of thin and light weight material, such as light cardboard.

In the modification illustrated in Figs. 10 and 11, the grid comprises a plurality of closely spaced adjustable strips or slats 80 extending longitudinally of the grid frame 81, and disposed below the slats 80 are a plurality of closely spaced adjustable strips or slats 83. Slats 80 may be secured by clips 80' to longitudinal rods 84, while slats 83 may be secured by clips 83' to transverse rods 82, so that both of the sets of perpendicularly arranged slats 80 and 83 may be adjusted for controlling the direction of admission of the sun's rays through the openings therebetween. For actuating the movable strips 80 and 83, the respective racks 87 and 85 extending transversely and longitudinally of the grid frame within the housing are provided, connected to the respective slats by means of pins 86, whereby both sets of slats may be angularly swung to be in alignment with the sun's rays or for controlling direction of the openings therebetween. Any suitable means, for example such as above described, may be provided for shifting the bars 87 and 85.

While I have described my invention in detail and have referred to specific applications thereof, I do not intend that my invention shall be limited to such details or to such specific applications but intend that it shall be defined by the hereunto appended claims.

I claim:

1. In a housing for sun baths, comprising screened side and end faces, a top grid carried by the housing embodying closely spaced fixed strips and closely spaced strips pivotally supported in the housing and perpendicular to said fixed strips, a bar carried by the housing, and manually controlled means within the housing for actuating said bar to adjust said pivoted strips in alignment with the sun's rays.

2. A light-admitting and view-excluding grid comprising a plurality of closely spaced strips cooperatively associated with a plurality of closely spaced strips extending transverse to the first named strips, and means for angularly adjusting at least one of the sets of spaced strips to the direction of the sun's rays.

3. In a housing for sun bath treatment comprising view excluding but light admitting side and end faces, a top grid carried by the housing embodying closely spaced fixed strips, closely spaced strips pivotally supported by said housing and perpendicular to said fixed strips, a bar carried by the housing, manually controlled means for actuating said bar to adjust said pivoted strips in alignment with the sun's rays and means carried by one of said faces for reflecting a portion of the sun's rays into the treatment portion of said housing.

4. In a housing for sun bath treatments comprising view excluding but light admitting screened side and end faces, a top grid carried by the housing embodying closely spaced fixed strips, closely spaced strips pivotally supported by said housing normally perpendicular to said fixed strips, a rack bar carried by said housing, actuating means cooperating with said bar for adjusting said pivoted strips in alignment with the sun's rays controlling the admission thereof within the housing, a mirror carried by one of said faces for reflecting a portion of the sun's rays to the treatment portion of said housing, and means for ventilating the latter.

5. A housing for sun baths comprising side and end walls and a light admitting and view excluding top grid comprising a plurality of closely spaced strips cooperatively associated with a plurality of closely spaced strips extending transverse to the first named strips so as to define openings for admission of the sun's rays to the interior of said housing and means for angularly adjusting at least one of the sets of spaced strips to the direction of the sun's rays.

In testimony whereof I have hereunto subscribed my name this 13th day of December, 1928.

GEORGE A. PROCTOR.